US008725766B2

(12) United States Patent
Asikainen et al.

(10) Patent No.: US 8,725,766 B2
(45) Date of Patent: May 13, 2014

(54) SEARCHING TEXT AND OTHER TYPES OF CONTENT BY USING A FREQUENCY DOMAIN

(75) Inventors: Joonas Asikainen, Zurich (CH); Kenneth Olson, Ann Arbor, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 433 days.

(21) Appl. No.: 12/731,766

(22) Filed: Mar. 25, 2010
(Under 37 CFR 1.47)

(65) Prior Publication Data
US 2011/0238698 A1   Sep. 29, 2011

(51) Int. Cl.
*G06F 17/30*   (2006.01)

(52) U.S. Cl.
USPC ......................................... 707/780

(58) Field of Classification Search
CPC .......................... G06F 17/2785; G06F 17/2715
USPC ........... 707/780, 705, 758, 999.107; 704/231, 704/234; 706/12
See application file for complete search history.

(56) References Cited

U.S. PATENT DOCUMENTS

| | | | |
|---|---|---|---|
| 5,983,176 A * | 11/1999 | Hoffert et al. ................. | 704/233 |
| 6,230,192 B1 | 5/2001 | Roberts et al. | |
| 6,282,549 B1 * | 8/2001 | Hoffert et al. ........................ | 1/1 |
| 6,330,593 B1 | 12/2001 | Roberts et al. | |
| 6,510,410 B1 * | 1/2003 | Chen et al. ..................... | 704/251 |
| 6,803,919 B1 * | 10/2004 | Kim et al. ...................... | 345/582 |
| 7,277,766 B1 * | 10/2007 | Khan et al. ...................... | 700/94 |
| 7,286,978 B2 * | 10/2007 | Huang et al. ....................... | 704/9 |
| 7,451,078 B2 | 11/2008 | Bogdanov | |
| 7,684,988 B2 * | 3/2010 | Barquilla ................... | 704/256.1 |
| 2001/0014891 A1 * | 8/2001 | Hoffert et al. .............. | 707/104.1 |
| 2002/0184024 A1 * | 12/2002 | Rorex ........................... | 704/255 |
| 2003/0185417 A1 * | 10/2003 | Alattar et al. ................ | 382/100 |
| 2004/0133927 A1 * | 7/2004 | Sternberg et al. ............. | 725/136 |
| 2005/0015239 A1 * | 1/2005 | Bellegarda ........................ | 704/5 |
| 2006/0085187 A1 * | 4/2006 | Barquilla ...................... | 704/243 |
| 2006/0112133 A1 * | 5/2006 | Ljubicich et al. ............. | 707/102 |
| 2006/0184354 A1 * | 8/2006 | Huang et al. ...................... | 704/6 |
| 2007/0288478 A1 | 12/2007 | DiMaria et al. | |
| 2008/0071536 A1 * | 3/2008 | Nagashima ................... | 704/246 |
| 2008/0208891 A1 * | 8/2008 | Wang et al. ................... | 707/102 |
| 2009/0083228 A1 * | 3/2009 | Shatz et al. ....................... | 707/3 |
| 2009/0164213 A1 * | 6/2009 | Lennington et al. .......... | 704/231 |
| 2010/0257129 A1 * | 10/2010 | Lyon et al. ...................... | 706/12 |
| 2011/0238679 A1 * | 9/2011 | Asikainen et al. ............. | 707/756 |

* cited by examiner

*Primary Examiner* — Hung T Vy
(74) *Attorney, Agent, or Firm* — Inventive Patent Law P.C.; Jim H. Salter

(57) ABSTRACT

A method and a system are provided for searching content (e.g., text, metadata and/or a fingerprint, etc.). In one example, the system receives content and a query for matching the content. The content includes computer readable data. The system generates a feature vector for the content. Generating the feature vector comprises generating a signal from the content, generating a spectrogram from the signal, and generating the feature vector from the spectrogram. The system searches for at least one feature vector that matches the feature vector for the content.

21 Claims, 9 Drawing Sheets

US 8,725,766 B2

SEARCHING TEXT AND OTHER TYPES OF CONTENT BY USING A FREQUENCY DOMAIN

FIELD OF THE INVENTION

The present invention relates to searching content. More particularly, the present invention relates to searching text and/or other types of content by using a frequency domain.

BACKGROUND

One type of fingerprint is a compact representation of audio and/or video content that enables robust and efficient, both computationally and memory-wise, matching of the audio and/or video content associated with the fingerprint. Matching fingerprints may be part of a process for searching for data related to a chapter, such as a track, song, and/or a recording.

SUMMARY

Audio data may be identified by computing a fingerprint of the chapter and then by using the fingerprint to search for information in a database. U.S. Pat. Nos. 6,230,192 and 6,330,593 (the '192 and '593 patents), which are hereby incorporated by reference, provide conventional examples of such a method. The '192 and the '593 patents relate generally to delivering supplemental entertainment content to a user listening to a musical recording. The server described in these patents uses fingerprints to search for one or more matching fingerprints in a database. Upon finding any matching fingerprints, the server outputs the data stored in that matching record.

Like fingerprint matching, matching other content (e.g., text and/or metadata, etc.) may involve computing similarities between content (e.g., two text documents, etc.). Computing similarities may involve using a number of processing techniques, including without limitation frequency weighting of terms (e.g., words, etc.). Frequency weighting of words typically involves determining that if two text documents have many common words that are uncommon in the pool of all text documents considered, then those two text documents are likely a match (e.g., the same and/or substantially similar). Applications of content matching may include the following: representing content, searching content, comparing content, grouping content and/or finding a copyright infringer.

An obstacle of matching content is the sheer volume of content that may be contained in modern databases. Traditional methods of matching documents may lack techniques that allow the matching processes to occur in an efficient manner. Accordingly, more efficient methods for matching content (e.g., text, metadata and/or a fingerprint, etc.) are highly valuable.

In a first embodiment, a method is provided for searching content. The method comprises at least the following: receiving content and a query for matching the content, wherein the content includes computer readable data; generating a feature vector for the content, wherein generating the feature vector comprises generating a signal from the content, generating a spectrogram from the signal, and generating the feature vector from the spectrogram; and searching for at least one feature vector that matches the feature vector for the content.

In a second embodiment, a system is provided for searching. The system is configured for at least the following: receiving content and a query for matching the content, wherein the content includes computer readable data; generating a feature vector for the content, wherein generating the feature vector comprises generating a signal from the content, generating a spectrogram from the signal, and generating the feature vector from the spectrogram; and searching for at least one feature vector that matches the feature vector for the content.

In a third embodiment, a computer readable medium comprises one or more instructions for searching. The one or more instructions are configured for causing one or more processors to perform the following steps: receiving content and a query for matching the content, wherein the content includes computer readable data; generating a feature vector for the content, wherein generating the feature vector comprises generating a signal from the content, generating a spectrogram from the signal, and generating the feature vector from the spectrogram; and searching for at least one feature vector that matches the feature vector for the content.

The content may include without limitation text, metadata and/or a fingerprint. In some embodiments, the method further comprises at least one of the following: finding zero or more matching feature vectors that match the feature vector for the content; and sending to a user device a result of the searching and the finding.

The invention encompasses other embodiments configured as set forth above and with other features and alternatives. It should be appreciated that these embodiments may be implemented in numerous ways, including as a method, a process, an apparatus, a system or a device.

BRIEF DESCRIPTION OF THE DRAWINGS

The inventive embodiments will be readily understood by the following detailed description in conjunction with the accompanying drawings. To facilitate this description, like reference numerals designate like structural elements.

DETAILED DESCRIPTION

Figure 1:
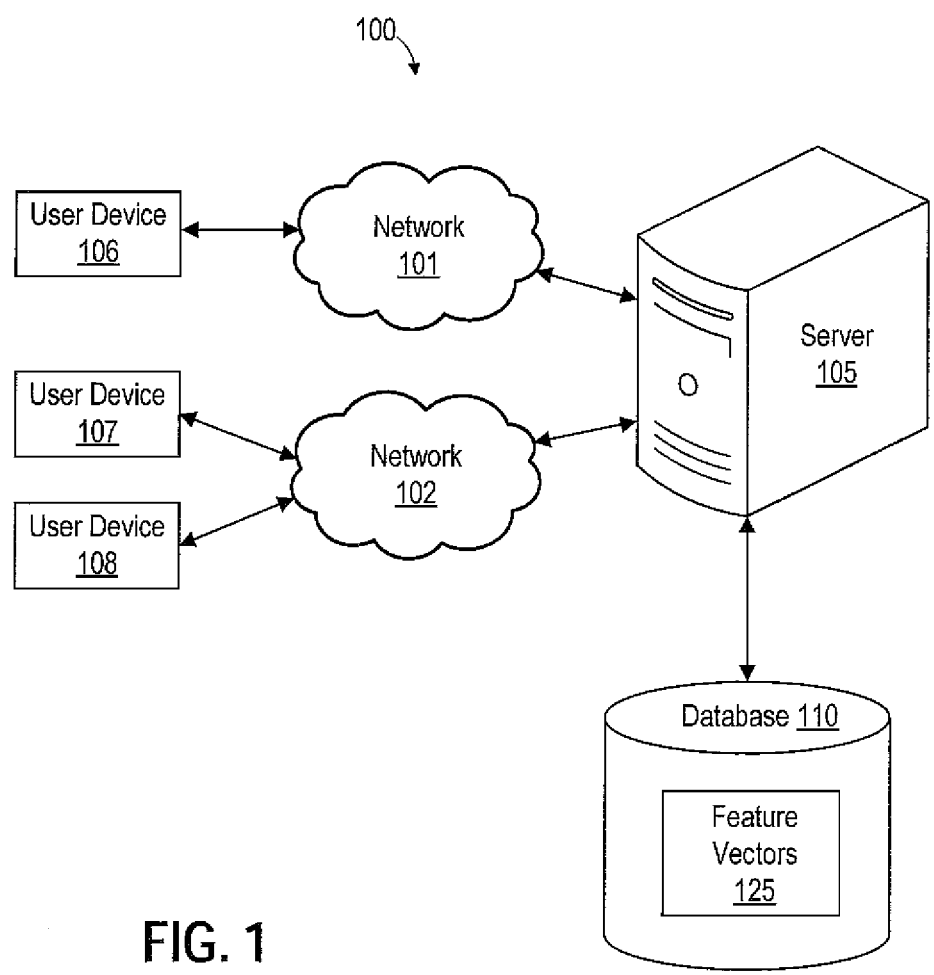
FIG. 1 is a block diagram of a system for matching frequency similarities for text and other types of content, in accordance with some embodiments.

An invention is disclosed for a method and a system for searching content (e.g., text, metadata and/or a fingerprint, etc.). Numerous specific details are set forth in order to provide a thorough understanding of various embodiments. It will be understood, however, to one skilled in the art, that the embodiments may be practiced with other specific details.

Definitions

Some terms are defined below in alphabetical order for easy reference. These terms are not rigidly restricted to these definitions. A term may be further defined by its use in other sections of this description.

"Content" means computer readable data. Examples of content include without limitation text, metadata and/or a fingerprint. Content may be in a standard format that comports with at least one of the following: Unicode, UCS (Universal Character Set), ISO (International Organization for Standardization), ANSI (American National Standards Institute), and/or ASCII (American Standard Code for Information Interchange), etc.

"Content block" means a group comprising one or more characters of content. Examples of a content block include without limitation a word and a Q-gram, which are defined below.

"Database" means a collection of data organized in such a way that a computer program may quickly select desired pieces of the data. A database includes an electronic filing system. In some implementations, the term "database" may be used as shorthand for "database management system".

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk.

"Fingerprint" (e.g., "audio fingerprint", "acoustic fingerprint" or "digital fingerprint") is a digital measure of certain properties of a waveform of an audio and/or visual signal (e.g., audio/visual data). An audio fingerprint is typically a fuzzy representation of an audio waveform generated by applying preferably a Fast Fourier Transform (FFT) to the frequency spectrum contained within the audio waveform. An audio fingerprint may be used to identify an audio sample and/or quickly locate similar items in an audio database. An audio fingerprint typically operates as an identifier for a particular item, such as, for example, a track, a song, a recording, an audio book, a CD, a DVD and/or a Blu-ray Disc. An audio fingerprint is an independent piece of data that is not affected by metadata. A company like Rovi™ Corporation may have databases that store over 100 million unique fingerprints for various audio samples. Practical uses of audio fingerprints include without limitation identifying songs, identifying recordings, identifying melodies, identifying tunes, identifying advertisements, monitoring radio broadcasts, monitoring peer-to-peer networks, managing sound effects libraries and/or identifying video files.

"Fingerprinting" is the process of generating a fingerprint for an audio and/or visual waveform. U.S. Pat. No. 7,277,766 (the '766 patent), entitled "Method and System for Analyzing Digital Audio Files", which is herein incorporated by reference, provides an example of an apparatus for audio fingerprinting an audio waveform. U.S. Pat. No. 7,451,078 (the '078 patent application), entitled "Methods and Apparatus for Identifying Media Objects", which is herein incorporated by reference, provides an example of an apparatus for generating an audio fingerprint of an audio chapter. U.S. patent application Ser. No. 12/456,177, by Jens Nicholas Wessling, entitled "Managing Metadata for Occurrences of a Chapter", which is herein incorporated by reference, provides an example of identifying metadata by storing an internal identifier (e.g., fingerprint) in the metadata.

"Hashing" means applying a hash function to specified data. A hash function is a procedure or mathematical function which typically converts a large, possibly variable-sized amount of data into a smaller amount of data. A hash function preferably includes a string hash function that is used to generate a hash value that is unique or almost unique. Examples of a hash function include without limitation any MD (Message-Digest Algorithm), MD2 (Message-Digest Algorithm 2), MD3 (Message-Digest Algorithm 3), MD4 (Message-Digest Algorithm 4), MD5 (Message-Digest Algorithm 5) and MD6 (Message-Digest Algorithm 6). A hash value may also be referred to as a hash code, a hash sum, or simply a hash. Hash functions are mostly used to speed up table lookup or data comparison tasks, such as finding items in a database, detecting duplicated or similar records in a large file, and so on. A hash lookup, by using a hash table, preferably has a computational complexity of about $O(1)$ time. $O(1)$ time, refers to the computation time of a problem when the time needed to solve that problem is bounded by a value that does not depend on the size of the data it is given as input. For example, accessing any single element (e.g., hash value) in an array (e.g., hash table) takes about $O(1)$ time, as only one operation has to be made to locate the element. For instance, during a hash lookup, the hash value itself indicates exactly where in memory the hash value is supposed to be; the hash value is either there or not there. A hash value is a number that may be represented in a standardized format, such as, for example, a 128-bit value or a 32-digit hexadecimal number. The length of the hash value is determined by the type of algorithm used. The length of the hash value preferably depends on the number of entries in the system, and does not depend on the size of the value being hashed. Every pair of non-identical files will likely translate into a different hash value, even if the two files differ only by a single bit. Each time a particular file is hashed by using the same algorithm, the exact same, or substantially similar, hash value will be generated.

"MD5" is Message-Digest algorithm 5 hash function. The MD5 function processes a variable-length message into a fixed-length output of 128 bits. The input message is broken up into chunks of 512-bit blocks (sixteen 32-bit little endian integers). The message is padded so that its length is divisible by 512. The padding works as follows: first a single bit, 1, is appended to the end of the message. This single bit is followed by as many zeros as are required to bring the length of the message up to 64 bits fewer than a multiple of 512. The remaining bits are filled up with a 64-bit integer representing the length of the original message, in bits. The main MD5 algorithm operates on a 128-bit state, divided into four 32-bit words, denoted A, B, C and D. These are initialized to certain fixed constants. The main MD5 algorithm then operates on each 512-bit message block in turn, each block modifying the state. The processing of a message block comprises four similar stages, termed rounds. Each round comprises 16 similar operations based on a non-linear function F, modular addition, and left rotation.

"Metadata" generally means data that describes data. More particularly, metadata means data that describes the contents of a digital audio and/or video recording. For example, metadata may include without limitation movie title, actors names, director name, and/or genre of movie (e.g., horror, drama or comedy).

"Network" means a connection between any two or more computers, which permits the transmission of data. A network may be any combination of networks, including without limitation the Internet, a local area network, a wide area network, a wireless network and a cellular network.

"Q-gram" means a type of content block comprising Q characters, where Q is a positive integer. One Q-gram may include no words, one word, multiple words and/or a partial word. Generating Q-grams includes without limitation the following: reading normalized content; and designating a Q-gram from every character forward for Q characters and/or until the last character of the content is included in a Q-gram.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"User" means a consumer, client, and/or client device in a marketplace of products and/or services.

"User device" (e.g., "client", "client device" or "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a laptop computer, desktop computer, a CD player, a DVD player, a Blu-ray Disc player, a smart phone, a cell phone, a personal media device, a portable media player, an iPod™, a Zune™ Player, a palmtop computer, a mobile phone, an mp3 player, a digital audio recorder, a digital video recorder, an IBM-type personal computer (PC) having an operating system such as Microsoft Windows™, an Apple™ computer having an operating system such as MAC-OS, hardware having a JAVA-OS operating system, and/or a Sun Microsystems Workstation having a UNIX operating system.

"Web browser" means any software program which can display text, graphics, or both, from Web pages on Web sites. Examples of a Web browser include without limitation Mozilla Firefox™ and Microsoft Internet Explorer™.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

"Word" means a type of content block that is a unit of language. A word comprises a written representation of one or more spoken sounds. A word is preferably an entry in a dictionary of the language of the content being analyzed. Words are usually separated by spaces in writing.

Overview of Architecture

FIG. 1 is a block diagram of a system 100 for matching frequency similarities for text and for other types of content, in accordance with some embodiments. The system 100 includes without limitation a server 105 and a database 110. The server 105 may be a server system that includes without limitation an application server and/or a database server.

The server 105 is preferably coupled to (or includes) the database 110. The database 110 may store, among other things, data collected and/or generated from one or more exemplary user devices 106, 107, and 108. As shown in FIG. 1, the user devices are coupled to the same network, or alternatively, to different networks. For instance, the user device 106 is illustrated as coupled to the network 101, while the user devices 107 and 108 are coupled to the network 102. The networks 101 and 102 include a variety of network types such as, for example, local area networks, wide area networks, networks of networks, the Internet, as well as home media type networks. The database 110 preferably includes feature vectors 125, which are generated as discussed below with reference to FIG. 2 and other figures. The database 110 may also include other data related to items, such as, for example, text files, tracks, songs and/or recordings, among other things.

It will be readily appreciated that the schematic of FIG. 1 is for explanatory purposes, and that numerous variations are possible. For example, the system 100 may include a database (or system of databases) arranged in a configuration that is different than the database 110 depicted here. Other configurations exist as well.

Converting Content into a Feature Vector

Figure 2:
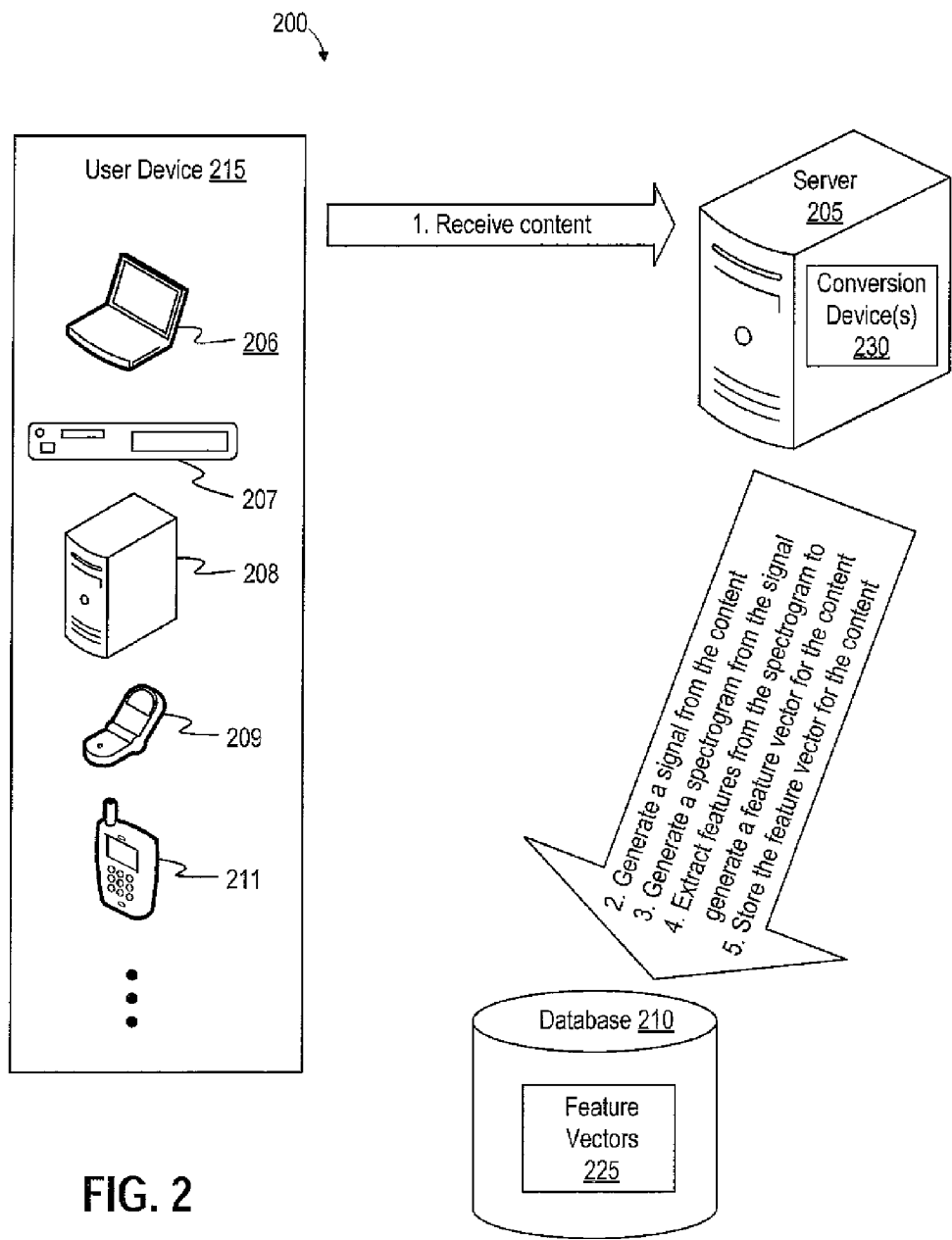
FIG. 2 is a schematic diagram of a system for converting content into a feature vector, in accordance with some embodiments.

FIG. 2 is a schematic diagram of a system 200 for converting content into a feature vector, in accordance with some embodiments. A purpose for converting content into a feature vector is to facilitate one or more of the following tasks: representing content, comparing content, grouping together similar content, and searching for content matching to given content. Content may include without limitation text, metadata and/or a fingerprint.

The system 200 may be configured like the system 100 of FIG. 1. The system 200 preferably comprises one or more user devices 215, a server 205 and a database 210. Examples of a user device 215 include without limitation a laptop computer 206, a disc player 207, a workstation 208, a cell phone 209, and/or a smart phone 211. The server 205 may be a server system that includes without limitation an application server and/or a database server. The database 210 is configured to store one or more feature vectors 225, among other things.

The server 205 includes without limitation one or more conversion device(s) 230, which is configured for converting content into a feature vector. The server 205 receives content preferably from one or more user devices 215. Alternatively, the server 205 may receive content from the database 210 and/or from another source. The content preferably includes text, but may include other types of content as well.

The system 200 generates a signal from the content (e.g., text, metadata and/or a fingerprint) received from a user device 215. The system 200 generates the signal by assigning numerical values (e.g., hash values) to content blocks (e.g., words, Q-grams, etc.) of the content. The signal is analogous to an audio and/or video signal. The signal generation is discussed further with respect to FIG. 5 and FIG. 6.

The system 200 generates a spectrogram from the signal, and extracts features from the spectrogram to generate a feature vector for the content. The system 200 uses spectrograms and/or feature vectors to perform content representing, searching, comparing and/or grouping. Content representing is discussed further with respect to FIG. 3, FIG. 4, FIG. 5 and FIG. 6. Content searching, comparing and grouping are discussed further with respect to FIG. 7 and FIG. 8.

The system stores the feature vector for the content in the database 210. The database 210 is configured for storing, among other things, feature vectors of content.

Figure 3:
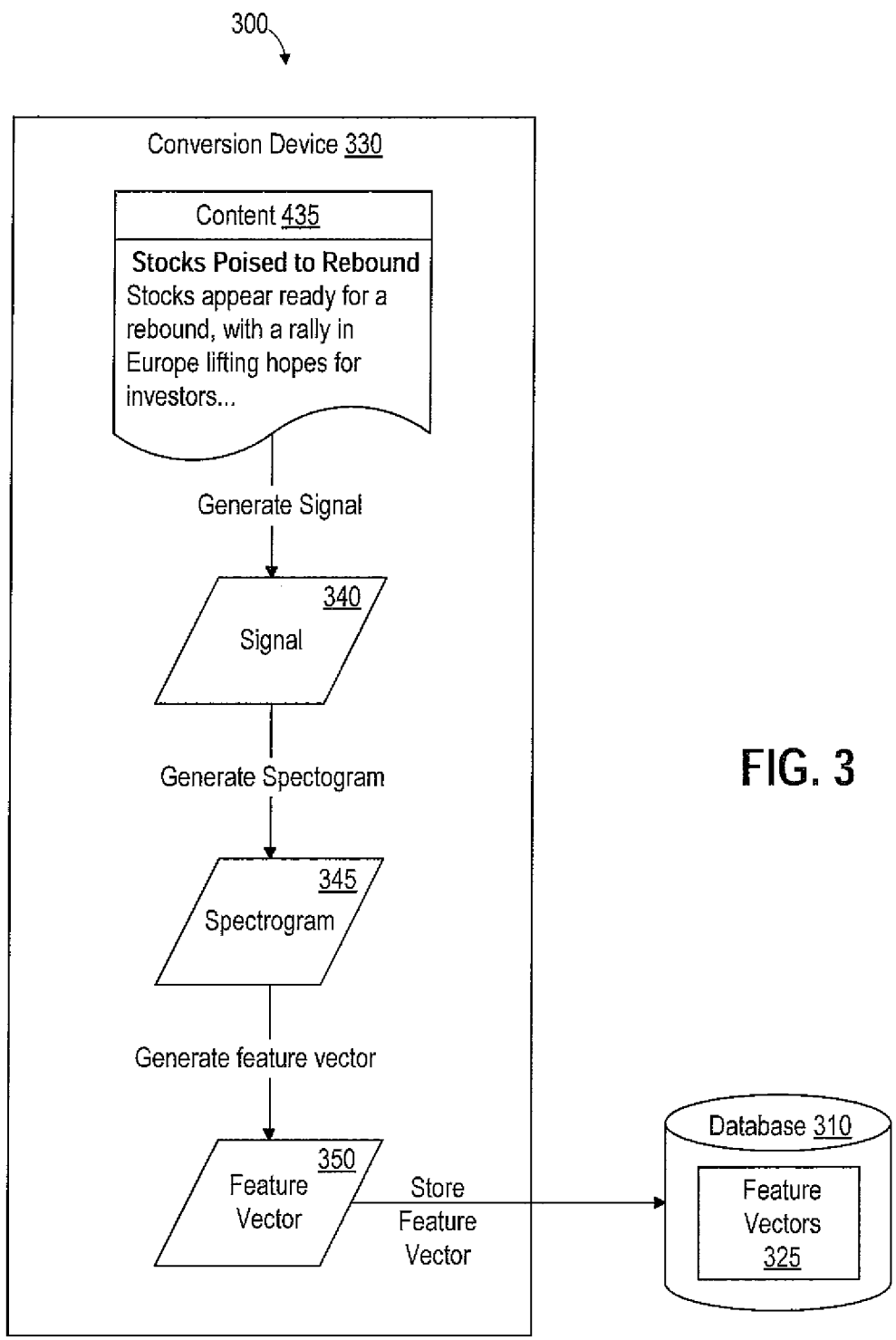
FIG. 3 is a schematic diagram of a system that includes a conversion device, in accordance with some embodiments.

FIG. 3 is a schematic diagram of a system 300 that includes a conversion device 330, in accordance with some embodiments. The conversion device 330 may be configured like the conversion device 230 of FIG. 2. The conversion device 330 is configured for performing a number of tasks, including without limitation generating a signal 340 from content 435 (e.g., a text document, etc.), generating a spectrogram 345 from the signal 340, generating a feature vector 350 from the spectrogram 345, and storing the feature vector 350 in a database 310.

The conversion device 330 is configured for receiving content 435 and generating a signal 340 from the content 435. The signal generation is based on associating numerical values (e.g., hash values) to content blocks (e.g., words, Q-grams, etc.) and generating a signal comprising numerical values following each other as a time sequence. The signal generation is discussed further with respect to FIG. 5 and FIG. 6.

The conversion device 330 is configured for generating a spectrogram 345 by applying, for example, a Fast Fourier Transform (FFT) to the frequency spectrum contained within the signal 340. Other methods may be used besides a Fast Fourier Transform. The spectrogram 345 is a time-frequency representation of the signal 340. The time-frequency representation enables extraction of features characteristic to given content. The conversion device 330 is configured for extracting features from the spectrogram 345 in order to generate a feature vector. The features may include combinations of multiple words that determine the essence of the content. Extracting features from a spectrogram is analogous to processes that occur with respect to digital audio fingerprinting (e.g., "fingerprinting" or "audio fingerprinting"). U.S. Pat. No. 7,277,766 (the '766 patent), entitled "Method and System for Analyzing Digital Audio Files", which is herein incorporated by reference, provides an example of an apparatus for audio fingerprinting an audio waveform. U.S. Pat. No. 7,451,078 (the '078 patent application), entitled "Methods and Apparatus for Identifying Media Objects", which is herein incorporated by reference, provides an example of an apparatus for generating an audio fingerprint of an audio chapter. U.S. patent application Ser. No. 12/456,177, by Jens Nicholas Wessling, entitled "Managing Metadata for Occurrences of a Chapter", which is herein incorporated by reference, provides an example of identifying metadata by storing an internal identifier (e.g., fingerprint) in the metadata.

The conversion device 330 is configured for storing the feature vector 350 in the database 310. The database 310 may store, among other things, one or more feature vectors of content (e.g., a text document, etc.).

Overview of Method for Converting Content into a Feature Vector

Figure 4:
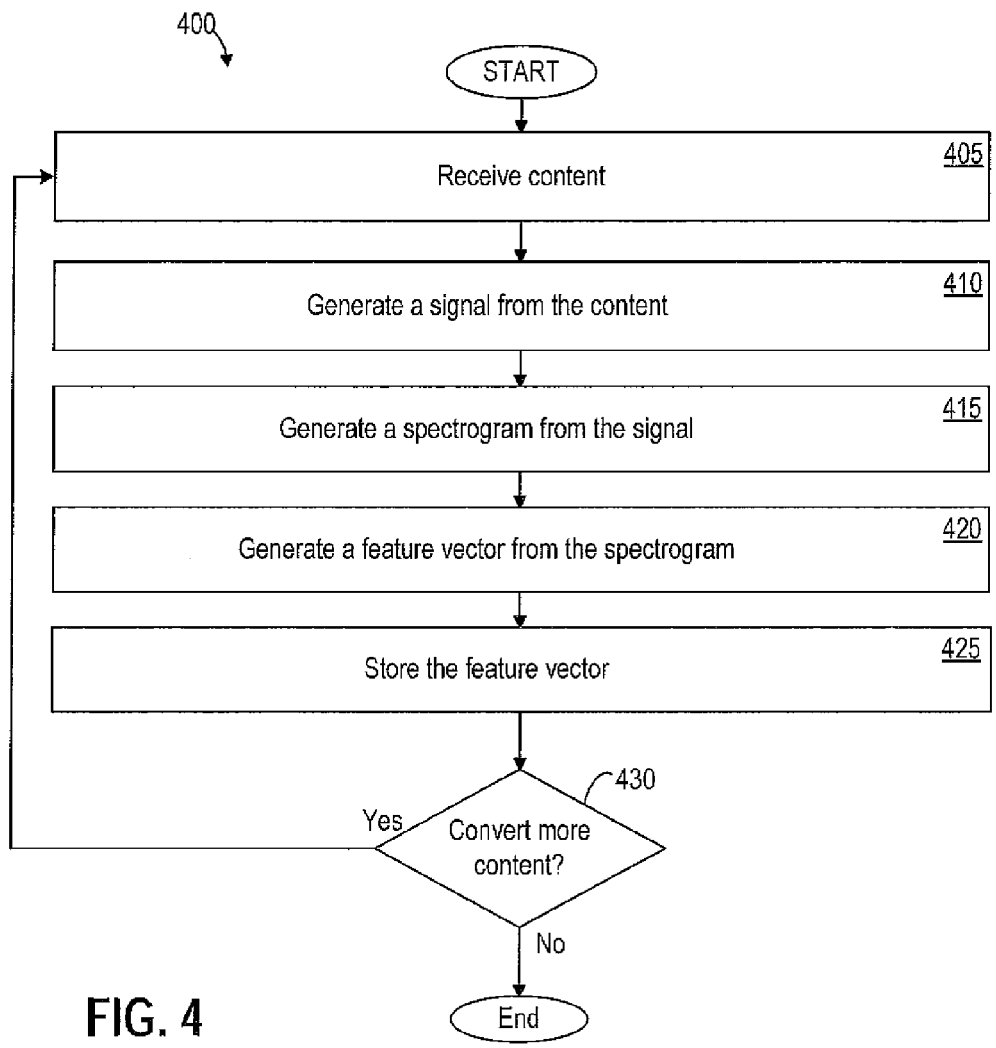
FIG. 4 is a flowchart of a method for converting content into a feature vector, in accordance with some embodiments.

FIG. 4 is a flowchart of a method 400 for converting content into a feature vector, in accordance with some embodiments. In some implementations, the steps of the method 400 may be carried out by the server 205 of FIG. 2. In an implementation, the method 400 of FIG. 4 operates in a real-time and/or unscheduled mode.

The method 400 starts in a step 405 where the system receives content preferably from a user device. The content may include without limitation text, metadata and/or a fingerprint.

The method 400 then moves to a step 410 where the system generates a signal from the content. The signal generation is based on associating numerical values (e.g., hash values) to content blocks (e.g., words, Q-grams, etc.) and generating a signal comprising numerical values following each other as a time sequence. The signal generation is discussed further with respect to FIG. 5 and FIG. 6.

Next, in a step 415, the system generates a spectrogram from the signal. For example, the system may apply a Fast Fourier Transform (FFT) to the frequency spectrum contained within the signal.

Then, in a step 420, the system generates a feature vector from the spectrogram. Extracting features from a spectrogram is analogous to processes that occur with respect to digital audio fingerprinting (e.g., "fingerprinting" or "audio fingerprinting"). The method 400 then proceeds to a step 425 where the system stores the feature vector on a database.

Next, in a decision operation 430, the system determines if more content is to be converted to a feature vector. If the system determines that more content is to be converted to a feature vector, then the method 400 returns to the step 405 where the system receives more content. However, in the decision operation 430, if the system determines that no more content is to be converted to a feature vector, then the method 400 concludes after the decision operation 430.

Note that this method 400 may include other details and steps that are not discussed in this method overview. Other details and steps are discussed above with reference to the appropriate figures and may be a part of the method 400, depending on the embodiment.

Generating a Signal from Content

Figure 5:
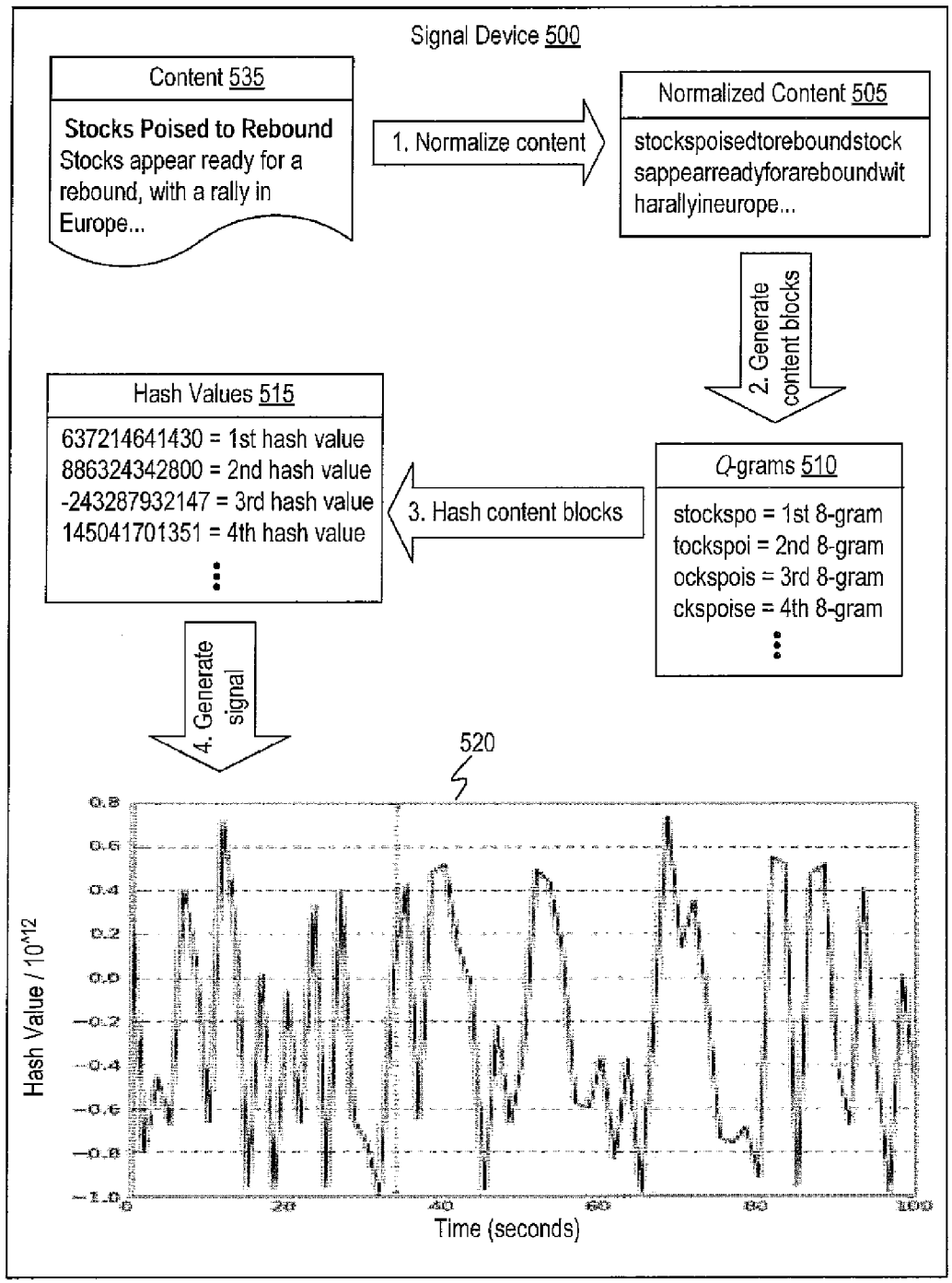
FIG. 5 is a schematic diagram of a signal device for generating a signal from content, in accordance with some embodiments.

FIG. 5 is a schematic diagram of a signal device 500 for generating a signal 520 from content 535, in accordance with some embodiments. The description of FIG. 5 may provide additional details for the step 410 of FIG. 4. In some embodiments, the signal device 500 is a subpart of the conversion device 230 of FIG. 200 and/or the conversion device 300 of FIG. 3.

The signal device 500 generates normalized content 505 by normalizing the content 535. The content 535 is preferably text, but is not limited to text. Other types of content include without limitation metadata and/or a fingerprint. For explanatory purposes, the content 535 is a text document, and more specifically a news article. The content 535 includes without limitation the following text inside the quotation marks:

"Stocks Poised to Rebound Stocks appear ready for a rebound, with a rally in Europe lifting hopes for investors".

Another example of content is metadata, which may be represented by text. The following text inside the quotation marks is an example of metadata:

"Artist=Stevie Wonder; Song Name=Isn't She Lovely".

Yet another example of content is an audio fingerprint, which may be represented by text. The following text inside the quotation marks is an example of an audio fingerprint:

"dkqociujqkenbmznbalwoeriteud-
iaxizlkdqkerytusdiaodiflzkhjdhghzzcxbcmksaqpow".

Normalization includes a process by which content (e.g., text, metadata and/or a fingerprint, etc.) is transformed in some way to make the content more consistent for computer reading purposes. For example, the signal device 500 may normalize the content 535 by removing formatting. Formatting may include, for example, bolding, italicizing, underlining, capital letters, lower case letters, superscript, subscript, punctuation, abbreviations, accent marks and other formatting. The following example of normalized content includes spaces between words:

"stocks poised to rebound stocks appear ready for a rebound with a rally in europe".

Normalizing text may also include removing white spaces from text. White space may include, for example, tabs, line breaks and spaces between characters. The example of normalized content 505 in FIG. 5 includes the following text without white space:

"stockspoisedtoreboundstock-
sappearreadyforareboundwitharallyineu rope".

The signal device 500 identifies and/or generates content blocks from normalized content. In a first example of identifying and/or generating content blocks, the signal device 500 generates Q-grams 510 from the normalized content 505, as illustrated in FIG. 5. A Q-gram is a type of content block comprising Q characters, where Q is a positive integer. One Q-gram may include no words, one word, multiple words and/or a partial word. For explanatory purposes, the Q-grams 510 are 8-grams, and Q is equal to 8. Generating Q-grams 510 includes without limitation the following: reading normalized content 505; and designating a Q-gram from every character forward of a starting character, for Q characters and/or until the last character of the content is included in a Q-gram. For example, generating the 8-grams includes without limitation reading the normalized content 505 and designating an 8-gram from every character forward. In FIG. 5, the first 8-gram is "stockspo". The second 8 gram is "tockspoi". The third 8 gram is "ockspois". The fourth 8 gram is "ckspoise". The designation of Q-grams continues until a maximum number of Q-grams are designated, or until a sufficient number of Q-grams are designated. For example, the designation of 8-grams continues until a maximum number of 8-grams are designated, or until a sufficient number of 8-grams are designated.

In a second example (not shown) of identifying/generating content blocks, the signal device 500 may identify the individual words from normalized content. Each word is a type of content block that is a unit of language. A word comprises a written representation of one or more spoken sounds. A word is preferably an entry in a dictionary of the language of the content being analyzed. Words are usually separated by spaces in writing.

The signal device 500 generates a value for each content block (e.g., word, Q-gram, etc.). The result of generating values preferably includes relatively low values for common words (e.g., conjunctions and pronouns) and/or common Q-grams. The results of generating values will preferably include relatively high values for contextually significant words and/or contextually significant Q-grams.

In the example of FIG. 5, the signal device 500 generates hash values 515 by hashing the Q-grams 510. The signal device 500 may hash the Q-grams 510 by applying a hash function to the Q-grams 510. Examples of a hash function include without limitation MD5 (Message-Digest Algorithm 5) and/or MD6 (Message-Digest Algorithm 6). A value returned by a hash function is called a hash value, a hash code, a hash sum, or simply a hash. Accordingly, by hashing the content blocks (e.g., words, Q-grams, etc.) of the content (e.g., text, metadata and/or a fingerprint, etc.), each content block is associated with a unique numerical value (e.g., hash value, etc.).

In this example of hash values 515, the first hash value is 637214641430. The second hash value is 886324342800. The third hash value is −243287932147. The fourth hash value is 145041701351. The application of the hash function continues until all of the Q-grams have been hashed, or until a sufficient number of Q-grams have been hashed. For example, the application of the hash function continues until all of the 8-grams have been hashed, or until a sufficient number of 8-grams have been hashed.

In an alternative embodiment, the Q-grams 510 are dynamically sized and not statically sized and/or not uniformly sized. The Q-grams 510 in consideration for a single batch (e.g., a single text document) may include a combination of Q-grams of varying lengths, where each Q is a positive integer. For example, the Q-grams 510 may include a combination of 2-grams, 3-grams, 5-grams, 8-grams and/or 12-grams, etc., for a single batch (e.g., a single text document) undergoing analysis by the signal device 500.

The signal device 500 generates a signal from the values of the content blocks (e.g., words, Q-grams, etc.). In the example of FIG. 5, the signal device 500 generates a signal from the hash values 515 of the Q-grams 510. The signal 520 includes a representation of the hash value versus time (e.g., seconds). For example, there may be a designation of 0.1 seconds between one hash value and the next hash value. Accordingly, the signal 520 preferably includes a waveform representation of the content 535.

The signal device 500 may generate a signal 520 from any content 535 that may be converted into computer readable standardized content. Content may be in a standard format that comports with at least one of the following: Unicode, UCS (Universal Character Set), ISO (International Organization for Standardization), ANSI (American National Standards Institute), and/or ASCII (American Standard Code for Information Interchange), etc.

Accordingly, the signal device 500 may generate a signal 520 from content 535 that comports with any language, including letter-based languages (e.g., English, Spanish, French, German, etc.) and symbol-based languages (e.g., Mandarin, Cantonese, etc.). For example, content written in a symbol-based language (e.g., Mandarin, Cantonese, etc.) may be converted into Unicode content, which is computer readable standardized content. The signal generation techniques applied to text content, as described above with reference to FIG. 5, may also be applied to any Unicode content and/or any computer readable standardized content. For example, the signal device may normalize Unicode content, generate Unicode content blocks (e.g., words, Q-grams, etc.) from the normalized Unicode content, hash the Unicode content blocks, and then generate a signal from the hash values.

In some embodiments, the signal device 500 may generate a signal for a part of content, as opposed to the whole of content. For example, the system may be configured for matching part of a text document (e.g., part of an electronic book), as opposed to the whole text document (e.g., whole electronic book). Accordingly, the similarity matching processes may be directed toward a matching location of content (e.g., each text document) in order to compare a part of the content, as opposed to the whole of the content.

Overview of Method for Generating a Signal from Content

Figure 6:
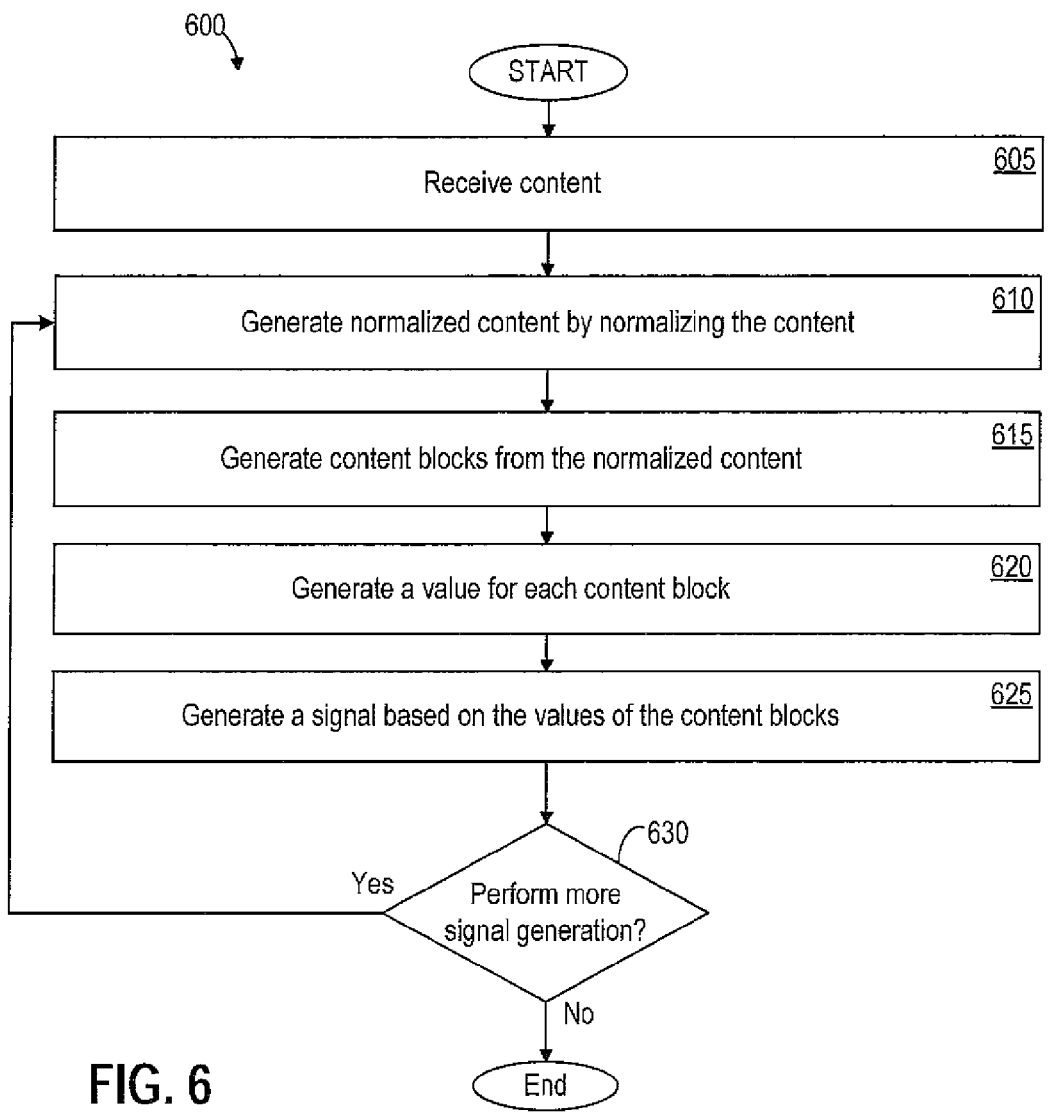
FIG. 6 is a flowchart of a method for generating a signal from content, in accordance with some embodiments.

FIG. 6 is a flowchart of method 600 for generating a signal from content, in accordance with some embodiments. In some implementations, the steps of the method 600 may be carried out by the signal device 500 of FIG. 5. In an implementation, the method 600 of FIG. 6 operates in a real-time and/or unscheduled mode.

The method starts in a step 605 where the system receives content. The content may include without limitation text, metadata and/or a fingerprint.

The method 600 moves to a step 610 where the system generates normalized content by normalizing the content. Normalization includes a process by which content (e.g., text, metadata and/or a fingerprint, etc.) is transformed in some way to make the content more consistent for computer reading purposes. Normalization is further described above with reference to FIG. 5.

The method 600 proceeds to a step 615 where the system generates and/or identifies content blocks (e.g., words, Q-grams, etc.) from the normalized content. For example, the system may generate words from the normalized content. As another example, the system may generate Q-grams from the normalized content, where Q is a positive integer. A Q-gram is a sequence of characters of a predetermined length. One Q-gram may include no words, one word, multiple words and/or a partial word. The generation of content blocks is further described above with reference to FIG. 5.

Next, in a step 620, the system generates a value for each content block. The system may generate a hash value for each content block by hashing each content block. For example, the system may hash words by applying a hash function to each word. As another example, the system may hash Q-grams by applying a hash function to each Q-gram. Examples of a hash function include without limitation MD5 (Message-Digest Algorithm 5) and/or MD6 (Message-Digest Algorithm 6). The process of hashing content blocks is further described above with reference to FIG. 5.

Then, in a step 625, the system generates a signal based on the values of the content blocks. For example, the system generates a signal based on the hash values of the words. As another example, the system generates a signal based on the hash values of the Q-grams. The signal preferably includes a waveform representation of the content. The generation of a signal is further described above with reference to FIG. 5.

Next, in a decision operation 630, the system determines if anymore signal generation is to be performed. If the system determines that there is more signal generation is to be performed, then the method 600 returns to the step 605 where the system receives more content. However, in the decision operation 630, if the system determines that no more signal generation is to be performed, then the method 600 concludes after the decision operation 630.

Note that this method 600 may include other details and steps that are not discussed in this method overview. Other details and steps are discussed above with reference to the appropriate figures and may be a part of the method 600, depending on the embodiment.

II.

Searching/Comparing/Grouping Content by using Feature Vectors

Figure 7:
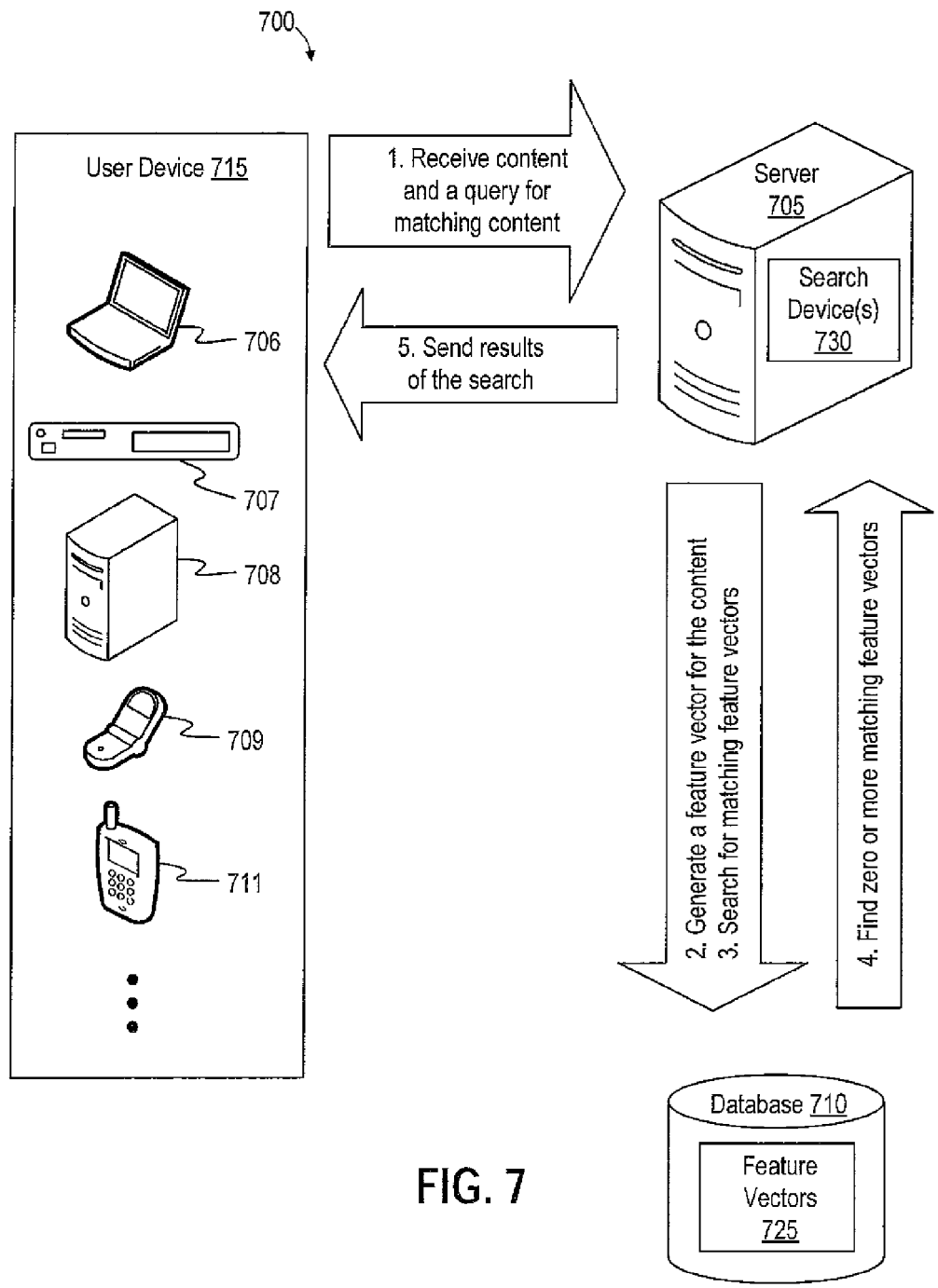
FIG. 7 is a schematic diagram of a system for searching, comparing and/or grouping content by using feature vectors, in accordance with some embodiments.

FIG. 7 is a schematic diagram of a system 700 for searching, comparing and/or grouping content by using feature vectors, in accordance with some embodiments. As mentioned above, a purpose for converting content into a feature vector is to facilitate at least the following tasks: representing content, comparing content, grouping together similar content, and/or searching for content matching to given content. The content may include without limitation text, metadata and/or a fingerprint.

The system 700 may be configured like the system 100 of FIG. 1. The system 700 preferably comprises one or more user devices 715, a server 705 and a database 710. Examples of a user device 715 include without limitation a laptop computer 706, a disc player 707, a workstation 708, a cell phone 709, and/or a smart phone 711. The server 705 may be a server system that includes without limitation one or more search device(s) 730, an application server and/or a database server. The database 710 is configured to store one or more feature vectors 725, among other things.

The server 705 is configured for searching data (e.g., content) in the database 710. More particularly, the search device 730 is configured for searching for matching feature vectors in the database 710. The search device 730 may compare a pair of feature vectors to determine if the feature vectors are similar. If two feature vectors are the same or substantially similar, then the corresponding contents are likely to be a match or substantially similar. For example, by comparing feature vectors, the system 700 may determine that the queried content is substantially similar to content associated with one or more feature vectors in the database 710. The system 700 may group together contents that are a match or are substantially similar. The grouped content may include without limitation the queried content and content associated with one or more feature vectors in the database 710.

A variety of search algorithms may be used for computationally efficient and scalable matching of feature vectors. U.S. patent application Ser. No. 12/615,586, by Jens Nicholas Wessling and Dustin James Williams, entitled "Matching a Fingerprint", which is herein incorporated by reference, provides an example of using hashing algorithms for storing, organizing and/or searching data.

The server 705 and/or database 710 may be configured for communicating with the user device 715 via a network, like one or more of the networks of FIG. 1. For example, a user may insert a disc (e.g., CD) into the user device 715 while the user device 715 is coupled to the network. The server 705 is configured for receiving, from a user device 715, content (e.g., text, metadata and/or a fingerprint, etc.) and a query for matching content. The server 705 preferably generates a feature vector for the content received from the user device 715. In an alternative embodiment, the server 705 receives, from the user device 715, the feature vector for the content.

The server 705 of some embodiments is configured for generating a feature vector by performing operations as described above with reference to FIG. 1 through FIG. 6. In one embodiment, the feature vector for the content from the user device 715 is generated in a substantially similar manner that the features vectors 725 already in the database 710 are generated. It is important, in this embodiment, that the feature vectors are generated in a substantially similar manner because, otherwise, the server 705 would not be able to find a matching feature vector in the database 710.

The server 705 may then search, in the database 710, for a matching feature vector 725 for the feature vector. As mentioned above, the feature vectors 725 in the database 710 are preexisting from a previous generation, as described above with reference to FIG. 2 through FIG. 6. One or more matching feature vectors may or may not exist in the database 710.

If the server 705 successfully finds a match, then the matching feature vector(s) in the database 710 may be associated with matching content. The matching content may be, for example, text, metadata and/or a fingerprint, etc. In one of many examples, text may be metadata that may include without limitation track title, artist name, producer name, and/or genre (e.g., classical, rock, jazz, hip-hop). The server 705 is configured for receiving data (e.g., search results) related to the matching feature vectors. The server 705 is configured for sending, to the user device 715, the search results and other data. The user device 715 may then display the search results.

It will be readily appreciated that the schematic of FIG. 7 is for explanatory purposes, and that numerous variations are possible. For example, some or all of the feature vectors 725 may be stored on the user device 715 and/or the server 705. For example, the user device 715 may contain a subset or a complete set of the data available in the database 710 that is coupled to the server 705. The user device 715 may be loaded with data from a CD-ROM (not shown). The user device 715 may store data on a hard disk of the user device 715. Alternatively, the user device 715 may download data from the database 710 through a network (not shown). While the user device 715 is offline, the user device 715 may then provide search results according to any matching feature vectors in the user device 715. For example, the user may insert a disc while the user device 715 is offline from the network. The disc may be, for example, a CD. The user device 715 may then provide the relevant search results by locating any matching feature vector in the user device 715. The user device 715 may also retrieve, from the user device 715, the relevant search results upon receiving a user's manual request. Other configurations exist as well.

In some embodiments, a feature vector may be referred to as a signature. The feature vectors (e.g., signatures) may be arranged in clusters as described in the U.S. patent application Ser. No. 12/456,194, by Jens Nicholas Wessling, entitled "Generating a Representation of a Cluster of Signatures by Using Weighted Sampling", which is herein incorporated by reference. During a search, identifying (e.g., recognizing) a cluster may occur more efficiently by searching representations of clusters, instead of the feature vectors within the clusters.

Identifying content (e.g., text, metadata and/or a fingerprint, etc.) may involve preliminary operations of generating feature vectors for storage in a database, as discussed above with reference to FIG. 2 through FIG. 6. U.S. patent application Ser. Nos. 12/378,841 and 12/378,840, entitled "Recognizing a Disc", which are hereby incorporated by reference, provide examples of methods for identifying (e.g., recognizing) a disc, among other items. Accordingly, other examples of data, besides feature vectors, exist as well. U.S. Patent Publication No. 20070288478 (the '478 Patent Publication), entitled "Method and System for Media Navigation", is hereby incorporated by reference. The '478 Patent Publication provides an example of a method for navigating and searching through media data on a database.

Overview of Method for Searching/Comparing/Grouping Content

Figure 8:
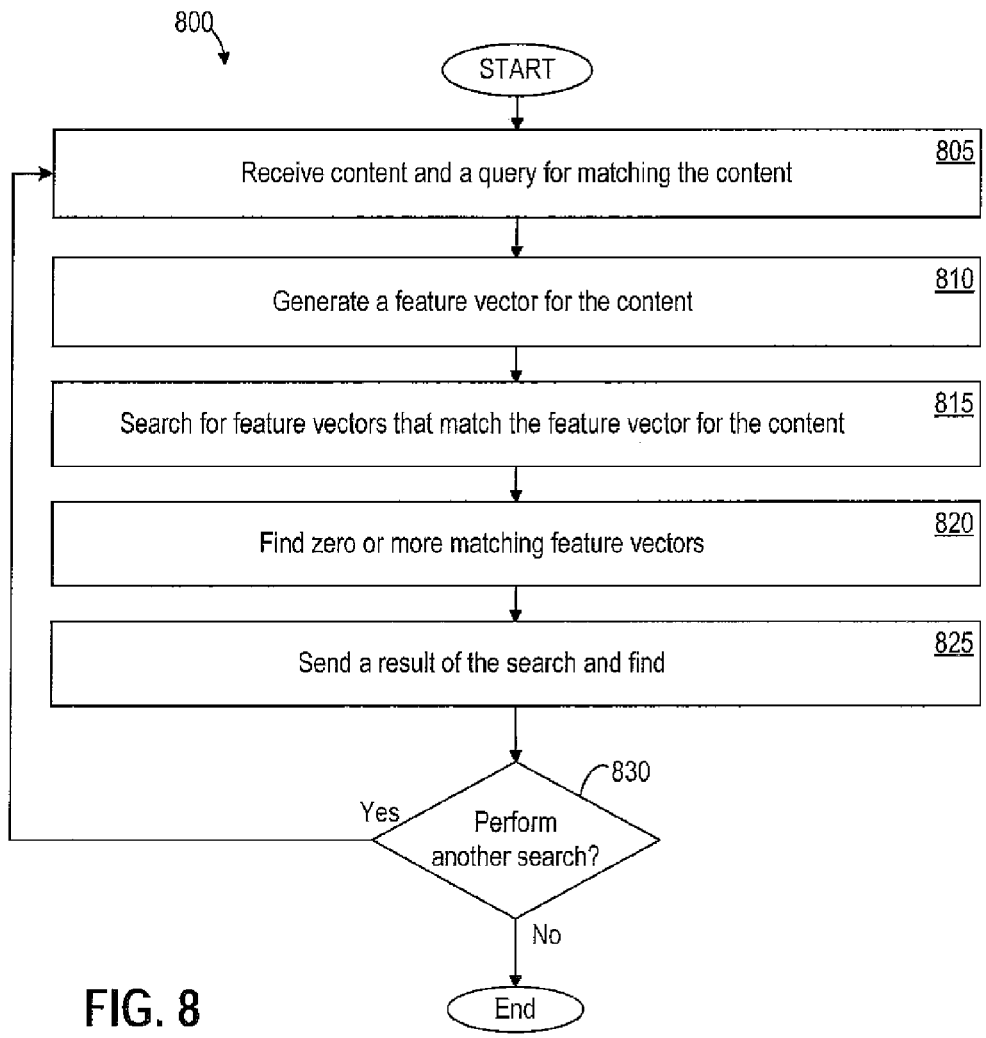
FIG. 8 is a flowchart of a method for searching, comparing and/or grouping content by using feature vectors, in accordance with some embodiments.

FIG. 8 is a flowchart of a method 800 for searching, comparing and/or grouping content by using feature vectors, in accordance with some embodiments. In some implementations, the steps of the method 800 may be carried out by one or more devices of the system 700 of FIG. 7. In an implementation, the method 800 of FIG. 8 operates in a real-time and/or unscheduled mode.

The method 800 starts in a step 805 where the system receives content and a query for matching the content. The system preferably receives the content and the query from a user device, as described above with reference to FIG. 7. The method 800 then moves to a step 810 where the system generates a feature vector for the content received from the user device. The feature vector may be generated according to operations described above with reference to FIG. 2 through FIG. 6.

Next, in a step 815, the system searches, in a database, for at least feature vector that matches the feature vector for the content from the user device. The system preferably searches for matching feature vectors among preexisting feature vectors that are previously generated, as described above with reference to FIG. 2 through FIG. 6. If the database does not include any preexisting feature vectors for content that may be in the database, then the system may generate a feature vector for the content, as described above with reference to FIG. 2 through FIG. 6.

Then, in a step 820, the system finds zero or more matching feature vectors. The method 800 then proceeds to a step 825 where the system sends a result of the search and the find, preferably to a user device as described above with reference to FIG. 7.

Next, in a decision operation 830, the system determines if another search is to be performed. If there is another search to be performed, then the method 800 returns to the step 805 where the system receives more content and another query. However, if the system determines in decision operation 830 that another search is not to be performed, then the method 800 concludes after the decision operation 830.

Note that this method 800 may include other details and steps that are not discussed in this method overview. Other details and steps are discussed above with reference to the appropriate figures and may be a part of the method 800, depending on the embodiment.

Computer Readable Medium Implementation

Figure 9:
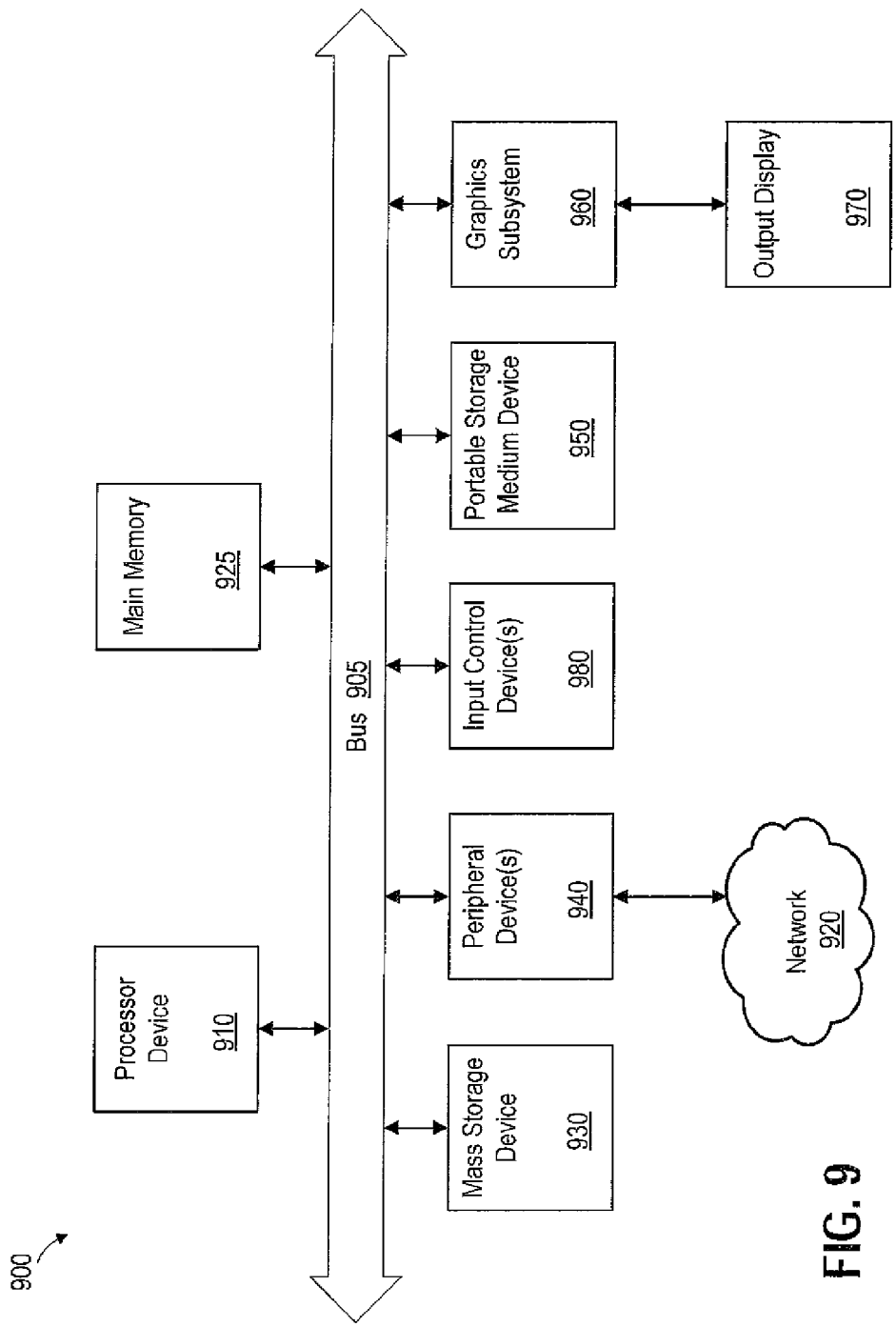
FIG. 9 is a block diagram of a general and/or special purpose computer system, in accordance with some embodiments.

FIG. 9 is a block diagram of a general and/or special purpose computer system 900, in accordance with some embodiments. The computer system 900 may be, for example, a user device, a user computer, a client computer and/or a server computer, among other things. Examples of a user device include without limitation a Blu-ray Disc player, a personal media device, a portable media player, an iPod™, a Zune™ Player, a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

The computer system 900 preferably includes without limitation a processor device 910, a main memory 925, and an interconnect bus 905. The processor device 910 may include without limitation a single microprocessor, or may include a plurality of microprocessors for configuring the computer system 900 as a multi processor system. The main memory 925 stores, among other things, instructions and/or data for execution by the processor device 910. If the system for generating a synthetic table of contents is partially implemented in software, the main memory 925 stores the executable code when in operation. The main memory 925 may include banks of dynamic random access memory (DRAM), as well as cache memory.

The computer system 900 may further include a mass storage device 930, peripheral device(s) 940, portable storage medium device(s) 950, input control device(s) 980, a graphics subsystem 960, and/or an output display 970. For explanatory purposes, all components in the computer system 900 are shown in FIG. 9 as being coupled via the bus 905. However, the computer system 900 is not so limited. Devices of the computer system 900 may be coupled through one or more data transport means. For example, the processor device 910 and/or the main memory 925 may be coupled via a local microprocessor bus. The mass storage device 930, peripheral device(s) 940, portable storage medium device(s) 950, and/or graphics subsystem 960 may be coupled via one or more input/output (I/O) buses. The mass storage device 940 is preferably a nonvolatile storage device for storing data and/or instructions for use by the processor device 910. The mass storage device 930, which may be implemented, for example, with a magnetic disk drive or an optical disk drive. In a software embodiment, the mass storage device 930 is preferably configured for loading contents of the mass storage device 930 into the main memory 925.

The portable storage medium device 950 operates in conjunction with a nonvolatile portable storage medium, such as, for example, a compact disc read only memory (CD ROM), to input and output data and code to and from the computer system 900. In some embodiments, the software for generating a synthetic table of contents may be stored on a portable storage medium, and may be inputted into the computer system 900 via the portable storage medium device 950. The peripheral device(s) 940 may include any type of computer support device, such as, for example, an input/output (I/O) interface configured to add additional functionality to the computer system 900. For example, the peripheral device(s) 940 may include a network interface card for interfacing the computer system 900 with a network 920.

The input control device(s) 980 provide a portion of the user interface for a user of the computer system 900. The input control device(s) 980 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 900 preferably includes the graphics subsystem 960 and the output display 970. The output display 970 may include a cathode ray tube (CRT) display and/or a liquid crystal display (LCD). The graphics subsystem 960 receives textual and graphical information, and processes the information for output to the output display 970.

Each component of the computer system 900 may represent a broad category of a computer component of a general and/or special purpose computer. Components of the computer system 900 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments may also be implemented by the preparation of application-specific integrated circuits or by interconnecting an appropriate network of conventional component circuits.

Some embodiments include a computer program product. The computer program product may be a storage medium and/or media having instructions stored thereon and/or therein which can be used to control, or cause, a computer to perform any of the processes of the invention. The storage medium may include without limitation floppy disk, mini disk, optical disc, Blu-ray Disc, DVD, CD-ROM, microdrive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable medium and/or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above. The processes described above may include without limitation the following: receiving content; generating normalized content by normalizing the content; generating words from the normalized content; generating a value for each word; and generating a signal based on values of the words.

Advantages

Applications that are useful with respect to audio fingerprinting may also be useful with respect to other content (e.g., text and/or metadata). Such applications may include without limitation representing, searching, comparing and/or grouping content. One obstacle with matching content is the sheer volume of content that may be contained in modern databases. Comparing a feature vector with other feature vectors is faster, and/or more efficient, than a traditional method of directly comparing content with other content. Traditional methods of representing, searching, matching, comparing and/or grouping content (e.g., text, metadata and/or a fingerprint, etc.) may lack techniques that allow the processes to occur in an efficient manner. For example, a traditional method/system may not comprise representing, searching, matching, comparing and/or grouping a feature vector for queried content with feature vectors in a database. Accordingly, the system described above is configured for representing, searching, matching, comparing and/or grouping content in a more efficient manner. Further, a more compact representation (e.g., a feature vector that saves memory/disk space) for content is highly valuable for modern computing systems because the compact representation may configure the modern computing system for performing faster representing, searching, matching, comparing and/or grouping of content.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for searching content, wherein the method is to be carried out by a computer system, the method comprising:

receiving content and a query for matching the content, wherein the content includes computer readable data;

generating normalized content by normalizing the content, wherein normalizing the content is a process by which content is transformed to make the content more consistent for computer reading purposes, wherein normalizing the content includes removing white spaces from text;

generating a feature vector for the normalized content, wherein generating the feature vector comprises generating a signal from the normalized content, generating a spectrogram from the signal, and generating the feature vector from the spectrogram by extracting features from the spectrogram; and searching for at least one feature vector that matches the feature vector for the content.

2. The method of claim 1, further comprising at least one of:

finding zero or more matching feature vectors that match the feature vector for the content; and sending to a user device a result of the searching and the finding.

3. The method of claim 2, wherein the content and the query are received from the user device, wherein a server is configured for carrying out the method for searching content, wherein the server is further configured for communicating with the user device via a network.

4. The method of claim 2, wherein a user device is at least one of:

a laptop computer;
a desktop computer;
a CD player;
a DVD player;
a Blu-ray Disc player;
a smart phone;
a cell phone;
a personal media device;
a portable media player;
an iPod™;
a Zune™ Player;
a palmtop computer;
a mobile phone;
an mp3 player;
a digital audio recorder;
a digital video recorder;
an IBM-type personal computer (PC);
an Apple™ computer;
hardware having a JAVA-OS operating system; and
Sun Microsystems Workstation having a UNIX operating system.

5. The method of claim 1, wherein searching for at least one feature vector comprises searching in a database including one or more feature vectors, wherein each of the feature vectors in the database is generated in a substantially similar manner in which the feature for the content is generated.

6. The method of claim 1, further comprising at least one of:

comparing the feature vector for the content with one or more feature vectors in a database, wherein comparing the features determines if the feature vector for the content is substantially similar to one or more feature vectors in the database;

determining that the feature vector for the content is substantially similar to one or more feature vectors in the database;

determining that the content is substantially similar to content associated with one or more feature vectors in the database; and grouping together contents that are substantially similar.

7. The method of claim 1, further comprising comparing the feature vector for the content with one or more features in a database, wherein comparing the feature vector with other feature vectors is faster than comparing the content with other content.

8. The method of claim 1, wherein generating the signal from the content comprises at least one of:

generating content blocks from the normalized content;

generating values for the content blocks by generating a value for each content block; and generating the signal for the content based on the values of the content blocks, wherein the signal includes a representation of the values versus time.

9. The method of claim 1, wherein the content includes at least one of:

text;
metadata; and
a fingerprint.

10. The method of claim 1, wherein the content is in a standard format that comports with at least one of:

Unicode;
Universal Character Set;
International Organization for Standardization;
American National Standards Institute; and
American Standard Code for Information Interchange.

11. A system comprising:

a processor;
a content searcher being executable by the processor to:
receive content and a query for matching the content, wherein the content includes computer readable data;
generate normalized content by normalizing the content, wherein normalizing the content is a process by which content is transformed to make the content more consistent for computer reading purposes, wherein normalizing the content includes removing white spaces from text;
generate a feature vector for the normalized content, wherein generating the feature vector comprises generating a signal from the normalized content, generating a spectrogram from the signal, and generating the feature vector from the spectrogram by extracting features from the spectrogram; and
search for at least one feature vector that matches the feature vector for the content.

12. The system of claim 11, wherein the system is further configured for at least one of:

finding zero or more matching feature vectors that match the feature vector for the content; and sending to a user device a result of the searching and the finding.

13. The system of claim 12, wherein the content and the query are received from the user device, wherein a server is configured for carrying out operations of the system for searching content, wherein the server is further configured for communicating with the user device via a network.

14. The system of claim 12, wherein the user device is at least one of:

a laptop computer;
a desktop computer;
a CD player;
a DVD player;
a Blu-ray Disc player;
a smart phone;
a cell phone;
a personal media device;
a portable media player;
an iPod™;
a Zune™ Player;
a palmtop computer;
a mobile phone;
an mp3 player;
a digital audio recorder;
a digital video recorder;
an IBM-type personal computer (PC);
an Apple™ computer;

hardware having a JAVA-OS operating system; and
Sun Microsystems Workstation having a UNIX operating system.

15. The system of claim 11, wherein searching for at least one feature vector comprises searching in a database including one or more feature vectors, wherein each of the feature vectors in the database is generated in a substantially similar manner in which the feature for the content is generated.

16. The system of claim 11, wherein the system is further configured for at least one of:
- comparing the feature vector for the content with one or more feature vectors in a database, wherein comparing the features determines if the feature vector for the content is substantially similar to one or more feature vectors in the database;
- determining that the feature vector for the content is substantially similar to one or more feature vectors in the database;
- determining that the content is substantially similar to content associated with one or more feature vectors in the database; and
- grouping together contents that are substantially similar.

17. The system of claim 11, wherein the system is further configured for comparing the feature vector for the content with one or more features in a database, wherein comparing the feature vector with other feature vectors is faster than comparing the content with other content.

18. The system of claim 11, wherein generating the signal from the content comprises at least one of:
- generating content blocks from the normalized content;
- generating values for the content blocks by generating a value for each content block; and
- generating the signal for the content based on the values of the content blocks, wherein the signal includes a representation of the values versus time.

19. The system of claim 11, wherein the content includes at least one of:
- text;
- metadata; and
- a fingerprint.

20. The system of claim 11, wherein the content is in a standard format that comports with at least one of:
- Unicode;
- Universal Character Set;
- International Organization for Standardization;
- American National Standards Institute; and
- American Standard Code for Information Interchange.

21. A non-transitory computer readable medium comprising one or more instructions for searching content, wherein the one or more instructions are configured for causing one or more processors to perform the steps of:
- receiving content and a query for matching the content, wherein the content includes computer readable data;
- generating normalized content by normalizing the content, wherein normalizing the content is a process by which content is transformed to make the content more consistent for computer reading purposes, wherein normalizing the content includes removing white spaces from text;
- generating a feature vector for the normalized content, wherein generating the feature vector comprises generating a signal from the normalized content, generating a spectrogram from the signal, and generating the feature vector from the spectrogram by extracting features from the spectrogram; and
- searching for at least one feature vector that matches the feature vector for the content.

* * * * *